United States Patent
Zhang et al.

(10) Patent No.: US 11,455,872 B2
(45) Date of Patent: Sep. 27, 2022

(54) FRONT-END DEVICE COLLABORATION METHOD, FRONT-END DEVICE, AND SECURITY PROTECTION PLATFORM

(71) Applicant: HUAWEI TECHNOLOGIES CO., LTD., Shenzhen (CN)

(72) Inventors: Yalan Zhang, Nanjing (CN); Yun Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/327,950

(22) Filed: May 24, 2021

(65) Prior Publication Data
US 2021/0280030 A1    Sep. 9, 2021

Related U.S. Application Data

(63) Continuation of application No. PCT/CN2019/090327, filed on Jun. 6, 2019.

(30) Foreign Application Priority Data

Nov. 27, 2020    (CN) .......................... 201811428740.X (51) Int. Cl.
*G08B 13/196* (2006.01)
*H04L 41/0631* (2022.01)
(Continued)

(52) U.S. Cl.
CPC . *G08B 13/19654* (2013.01); *G08B 13/19669* (2013.01); *H04L 41/069* (2013.01);
(Continued)

(58) Field of Classification Search
CPC ........ G08B 13/19654; G08B 13/19669; H04L 41/0631; H04L 41/0816; H04L 41/0893; H04L 41/069; H04L 7/181
See application file for complete search history.

(56) References Cited

U.S. PATENT DOCUMENTS

| | | | | |
|---|---|---|---|---|
| 2010/0022231 | A1* | 1/2010 | Heins .................. | H04M 3/4872 455/418 |
| 2011/0225247 | A1* | 9/2011 | Anantharaman ... | H04L 41/0816 709/224 |

(Continued)

FOREIGN PATENT DOCUMENTS

| | | | |
|---|---|---|---|
| CN | 103475853 A | | 12/2013 |
| CN | 108616430 A | * | 10/2018 |

OTHER PUBLICATIONS

Aghdasi et al. "FoV-Clustering as a Solution to a Novel Camera Node Activation Problem in WVSNs." 2010 IFIP Wireless Days. IEEE. Oct. 20-22, 2010. 5 pages.

*Primary Examiner* — Michael A Keller
*Assistant Examiner* — Jsing Forng Lin
(74) *Attorney, Agent, or Firm* — Maier & Maier, PLLC (57) ABSTRACT

Embodiments include a front-end device collaboration method, applied to a security and protection system to reduce a delay of a collaborative operation. The security and protection system includes a plurality of front-end devices, and the plurality of front-end devices include a first front-end device and a second front-end device. The method includes: the first front-end device determines that a preset collaboration trigger event exists; and the first front-end device sends a collaboration instruction to the second front-end device, where the collaboration instruction is used to instruct the second front-end device to perform an operation corresponding to the collaboration instruction.

15 Claims, 5 Drawing Sheets

(51) Int. Cl.
*H04L 41/069* (2022.01)
*H04L 41/0816* (2022.01)
*H04L 41/0893* (2022.01)
*H04N 7/18* (2006.01)

(52) U.S. Cl.
CPC ...... *H04L 41/0631* (2013.01); *H04L 41/0816* (2013.01); *H04L 41/0893* (2013.01); *H04N 7/181* (2013.01)

(56) References Cited

U.S. PATENT DOCUMENTS

2011/0314515 A1   12/2011  Hemoud et al.
2015/0170505 A1*  6/2015  Frew ..................... B60R 25/305
                                                              340/539.22
2018/0121740 A1*  5/2018  Boss ..................... H04N 7/181
2018/0233010 A1*  8/2018  Modestine ....... G08B 13/19671
2019/0165993 A1*  5/2019  Vyvyan ............... H04L 41/0627

* cited by examiner

FRONT-END DEVICE COLLABORATION METHOD, FRONT-END DEVICE, AND SECURITY PROTECTION PLATFORM

CROSS-REFERENCE TO RELATED APPLICATIONS

This application is a continuation of International Application No. PCT/CN2019/090327, filed on Jun. 6, 2019, which claims priority to Chinese Patent Application No. 201811428740.X, filed on Nov. 27, 2018, both of which are hereby incorporated by reference in their entireties.

TECHNICAL FIELD

The embodiments relate to the field of security protection technologies, and in particular, to a front-end device collaboration method, a front-end device, and a security protection platform.

BACKGROUND

A security and protection system is a system including a video surveillance system, an access control management system, a firefighting system, and the like. The video surveillance system usually includes a plurality of internet protocol cameras (IPC). Each IPC sends an obtained video stream to a video management system (VMS) also referred to as a video management platform. The access control management system, the firefighting system, and the like are usually managed by an internet of things (IoT) management platform.

In the prior art, security and protection subsystems such as the video surveillance system, the access control management system, and the firefighting system usually work independently. The plurality of IPCs in the video surveillance system may work in collaboration with each other. For example, after identifying an alarm event, one IPC may report the alarm event to the VMS. The VMS may send a control instruction to another IPC associated with the alarm event. In this way, the plurality of IPCs collaborate to continuously monitor a target.

In the prior art, collaboration between the plurality of IPCs in the video surveillance system needs to be implemented by sending a control instruction to an IPC by the VMS. As a result, in a scenario with a relatively high requirement on real-time performance, for example, in an airport aircraft takeoff surveillance process requiring surveillance collaboration between a plurality of IPCs, reporting to the VMS by one IPC and then sending, a control instruction by the VMS to invoke another IPC may cause a relatively long delay.

SUMMARY

Embodiments provide a front-end device collaboration method, applied to a security and protection system to reduce a delay of a collaborative operation.

A first aspect of the embodiments provides a front-end device collaboration method, applied to a security and protection system, where the security and protection system includes a plurality of front-end devices, and the plurality of front-end devices include a first front-end device and a second front-end device. The method includes: the first front-end device determines that a preset collaboration trigger event exists. The first front-end device sends a collaboration instruction to the second front-end device, where the collaboration instruction is used to instruct the second front-end device to perform an operation corresponding to the collaboration instruction.

The security and protection system includes the plurality of front-end devices, and there is a communication connection between the front-end devices. The front-end devices may monitor a surrounding environment, for example, an IPC may monitor a specific area. When the first front-end device determines that the preset collaboration trigger event exists through detection, for example, an IPC detects a face in a database through facial recognition, the first front-end device may directly send the collaboration instruction to the second front-end device by using a communication connection, where the collaboration instruction may be used to instruct the second front-end device to perform the operation corresponding to the collaboration instruction, for example, perform high-definition photographing.

According to the front-end device collaboration method provided in this embodiment, if the first front-end device determines that the collaboration trigger event exists, the first front-end device may send the collaboration instruction to the second front-end device, to instruct the second front-end device to perform the operation corresponding to the collaboration instruction. Because the first front-end device may directly send the collaboration instruction to the second front-end device, and the collaboration instruction does not need to be forwarded by a security protection platform, a delay of a collaborative operation can be reduced.

In a possible implementation of the first aspect, before the first front-end device sends a collaboration instruction to the second front-end device, the method further includes: The first front-end device receives and stores a configuration information set sent by the security protection platform, where the configuration information set includes configuration information of the second front-end device, and the configuration information of the second front-end device includes a capability of the second front-end device to perform the operation corresponding to the collaboration instruction.

According to the front-end device collaboration method provided in this embodiment, the first front-end device may receive the configuration information set sent by the security protection platform, where the configuration information set includes the capability of the second front-end device to perform the operation corresponding to the collaboration instruction. In other words, the first front-end device obtains a collaborative operation that the second front-end device may be instructed to perform. This improves implementability of the solution.

In a possible implementation of the first aspect, before the first front-end device sends a collaboration instruction to the second front-end device, the method further includes: the first front-end device obtains a collaboration policy. The sending a collaboration instruction to the second front-end device by the first front-end device includes: the first front-end device determines the second front-end device based on the collaboration policy, and the first front-end device sends the collaboration instruction to the second front-end device.

According to the front-end device collaboration method provided in this embodiment, the first front-end device obtains the collaboration policy, and an implementation in which the first front-end device determines, based on the collaboration policy, the second front-end device that performs the collaborative operation is provided. This improves the implementability of the solution.

In a possible implementation of the first aspect, the obtaining a collaboration policy by the first front-end device includes: the first front-end device receives the collaboration policy sent by the security protection platform; or the first front-end device obtains the collaboration policy configured by a user on a client.

According to the front-end device collaboration method provided in this embodiment, two manners of obtaining the collaboration policy by the first front-end device are provided. This improves flexibility of implementing the solution.

In a possible implementation of the first aspect, when a communication connection between the first front-end device and the second front-end device is interrupted, the first front-end device deletes a collaboration policy of the second front-end device from the collaboration policy; or the first front-end device receives a de-collaboration notification message sent by the security protection platform, and the first front-end device deletes a collaboration policy of the second front-end device from the collaboration policy based on an instruction of the de-collaboration notification message.

According to the front-end device collaboration method provided in this embodiment, an implementation of de-collaboration of the front-end device is provided. This improves integrity and the implementability of the solution.

In a possible implementation of the first aspect, the first front-end device sends first configuration information to the security protection platform, where the first configuration information includes a capability of performing the collaborative security protection action by the first front-end device.

According to the front-end device collaboration method provided in this embodiment, the first front-end device may send the configuration information of the first front-end device to the security protection platform. In this way, the configuration information can be exchanged between the front-end devices by using the security protection platform. This improves the implementability of the solution.

In a possible implementation of the first aspect, the first front-end device sends an alarm of the collaboration trigger event to the security protection platform.

According to the front-end device collaboration method provided in this embodiment, after detecting the preset collaboration trigger event, the first front-end device may send the alarm to the security protection platform. This improves the implementability of the solution.

A second aspect of the embodiments provides a front-end device collaboration method, applied to a security and protection system, where the security and protection system includes a plurality of front-end devices, and the plurality of front-end devices include a first front-end device and a second front-end device. The method includes: a security protection platform sends a collaboration policy to the first front-end device, where the collaboration policy is used by the first front-end device to determine the second front-end device from the plurality of front-end devices when the first front-end device detects a preset collaboration trigger event, and to instruct the second front-end device to perform an operation corresponding to a collaboration instruction. The security protection platform receives an alarm of the collaboration trigger event that is sent by the first front-end device.

The security and protection system includes the plurality of front-end devices, the security protection platform establishes a connection to each front-end device, and there is a communication connection between the front-end devices. The front-end devices may monitor a surrounding environment, for example, an IPC may monitor a specific area. The security protection platform sends the collaboration policy to the first front-end device, where the collaboration policy is used by the first front-end device to determine the second front-end device from the plurality of front-end devices when the first front-end device detects the preset collaboration trigger event, and to instruct the second front-end device to perform the operation corresponding to the collaboration instruction. When the first front-end device detects the preset collaboration trigger event, for example, an IPC detects a face in a database through facial recognition, the first front-end device may directly send the collaboration instruction to the second front-end device by using a communication connection, where the collaboration instruction may be used to instruct the second front-end device to perform the operation corresponding to the collaboration instruction, for example, perform high-definition photographing. The first front-end device further sends the alarm of the collaboration trigger event to the security protection platform.

According to the front-end device collaboration method provided in this embodiment, the security protection platform sends the collaboration policy to the first front-end device. When the first front-end device detects the preset collaboration trigger event, the first front-end device may determine the second front-end device from the plurality of front-end devices based on the collaboration policy, and instruct the second front-end device to perform the operation corresponding to the collaboration instruction. Because the first front-end device may directly send the collaboration instruction to the second front-end device, and the collaboration instruction does not need to be forwarded by the security protection platform, a delay of a collaborative operation can be reduced.

In a possible implementation of the second aspect, the method further includes: the security protection platform receives configuration information sent by the second front-end device, where the configuration information includes a capability of the second front-end device to perform the operation corresponding to the collaboration instruction. The security protection platform sends a configuration information set to the first front-end device, where the configuration information set includes the configuration information of the second front-end device.

According to the front-end device collaboration method provided in this embodiment, the security protection platform may send the received configuration information of the second front-end device to the first front-end device, and the first front-end device may receive the configuration information of the second front-end device that is sent by the security protection platform, and obtain the capability of the second front-end device to perform the operation corresponding to the collaboration instruction. This improves implementability of the solution.

In a possible implementation of the second aspect, the method further includes: when the security protection platform detects that the second front-end device is offline, or when the security protection platform receives de-collaboration information sent by the second front-end device, the security protection platform sends a de-collaboration notification message to the first front-end device, where the de-collaboration notification message is used to instruct the first front-end device to delete a collaboration policy of the second front-end device from the collaboration policy.

According to the front-end device collaboration method provided in this embodiment, an implementation of de-collaboration of the front-end device is provided. This improves integrity and the implementability of the solution.

A third aspect of the embodiments provides a front-end device collaboration method, applied to a security and protection system, where the security and protection system includes a first security protection platform and a second security protection platform. A first front-end device is a front-end device associated with the first security protection platform, a second front-end device is a device associated with the second security protection platform, and the method includes:

The first front-end device determines that a preset collaboration trigger event exists. The first front-end device sends an alarm to the first security protection platform. The first security protection platform sends, to the second security protection platform, a collaborative task request corresponding to the alarm. The second security protection platform forwards the collaborative task request to the second front-end device. The second front-end device performs an operation corresponding to the collaborative task.

In a possible implementation of the third aspect, the method further includes: the first front-end device obtains a collaboration policy before the first security protection platform sends the collaborative task request to the second security protection platform. The first front-end device determines, based on the collaboration policy, that a collaborative device corresponding to the collaboration trigger event is the second front-end device. The first front-end device sends information about the second front-end device to the first security protection platform.

In a possible implementation of the third aspect, the method further includes: after the first front-end device sends the alarm to the first security protection platform, the first security protection platform determines, based on the preset collaboration policy, that the collaborative device corresponding to the collaboration trigger event is the second front-end device.

In a possible implementation of the third aspect, the method further includes: the first front-end device determines, based on the collaboration policy, a collaboration operation of the collaborative device corresponding to the collaboration trigger event, or the first front-end device determines, based on the collaboration policy, a collaboration operation of the collaborative device corresponding to the collaboration trigger event.

A fourth aspect of the embodiments provides a front-end device, where the front-end device includes: a determining module, configured to determine that a preset collaboration trigger event exists; and a sending module, configured to send a collaboration instruction to a second front-end device, where the collaboration instruction is used to instruct the second front-end device to perform an operation corresponding to the collaboration instruction.

In a possible implementation of the fourth aspect, the front-end device further includes: an obtaining module, configured to receive and store a configuration information set sent by a security protection platform, where the configuration information set includes configuration information of the second front-end device, and the configuration information of the second front-end device includes a capability of the second front-end device to perform the operation corresponding to the collaboration instruction.

In a possible implementation of the fourth aspect, the obtaining module is further configured to: obtain a collaboration policy before the sending module sends the collaboration instruction to the second front-end device; and the sending module is configured to: determine the second front-end device based on the collaboration policy; and send the collaboration instruction to the second front-end device.

In a possible implementation of the fourth aspect, the obtaining module is configured to: receive the collaboration policy sent by the security protection platform; or obtain the collaboration policy configured by a user on a client.

In a possible implementation of the fourth aspect, the front-end device further includes: a deletion module, configured to: delete a collaboration policy of the second front-end device from the collaboration policy when a communication connection between the second front-end device and the first front-end device is interrupted; or the obtaining module is further configured to receive a de-collaboration notification message sent by the security protection platform; and the deletion module is further configured to delete a collaboration policy of the second front-end device from the collaboration policy based on an instruction of the de-collaboration notification message.

A fifth aspect of the embodiments provides a security protection platform, including: a sending module, configured to send a collaboration policy to a first front-end device, where the collaboration policy is used by the first front-end device to determine a second front-end device from a plurality of front-end devices when the first front-end device detects a preset collaboration trigger event, and to instruct the second front-end device to perform an operation corresponding to a collaboration instruction; and a receiving module, configured to receive an alarm of the collaboration trigger event that is sent by the first front-end device.

In a possible implementation of the fifth aspect, the receiving module is further configured to receive configuration information sent by the second front-end device, where the configuration information includes a capability of the second front-end device to perform the operation corresponding to the collaboration instruction; and the sending module is further configured to send a configuration information set to the first front-end device, where the configuration information set includes the configuration information of the second front-end device.

In a possible implementation of the fifth aspect, the sending module is further configured to: when the security protection platform detects that the second front-end device is offline, or when the security protection platform receives de-collaboration information sent by the second front-end device, send a de-collaboration notification message to the first front-end device, where the de-collaboration notification message is used to instruct the first front-end device to delete a collaboration policy of the second front-end device from the collaboration policy.

A sixth aspect of the embodiments provides a front-end device, including a processor, a memory, an input/output device, and a bus, where the processor, the memory, and the input/output device are separately connected to the bus. The front-end device has a function of implementing the front-end device collaboration methods in the first aspect to the third aspect.

A seventh aspect of the embodiments provides a security protection platform, including a processor, a memory, an input/output device, and a bus, where the processor, the memory, and the input/output device are separately connected to the bus. The front-end device has a function of implementing the front-end device collaboration methods in the first aspect to the third aspect.

An eighth aspect of the embodiments provides a security and protection system. The security and protection system includes the front-end device provided in the first aspect or the third aspect and the security protection platform provided in the second aspect or the third aspect.

A ninth aspect of the embodiments provides a computer program product, where the computer program product includes an instruction. When the instruction is run on a computer, the computer is enabled to perform the methods in the first aspect to the third aspect and the implementations of the first aspect to the third aspect.

A tenth aspect of the embodiments provides a computer-readable storage medium, where the computer-readable storage medium stores an instruction, and when the instruction is run on a computer, the methods provided in the first aspect to the third aspect of the embodiments and the implementations of the first aspect to the third aspect are implemented.

It can be understood from the foregoing technical solutions, the embodiments have at least the following advantages.

According to the front-end device collaboration method provided in the embodiments, if the first front-end device detects the collaboration trigger event, the first front-end device may send the collaboration instruction to the second front-end device, to instruct the second front-end device to perform the operation corresponding to the collaboration instruction. Because the first front-end device may directly send the collaboration instruction to the second front-end device, and the collaboration instruction does not need to be forwarded by the security protection platform, the delay of the collaborative operation can be reduced.

DETAILED DESCRIPTION OF THE EMBODIMENTS

Figure 1:
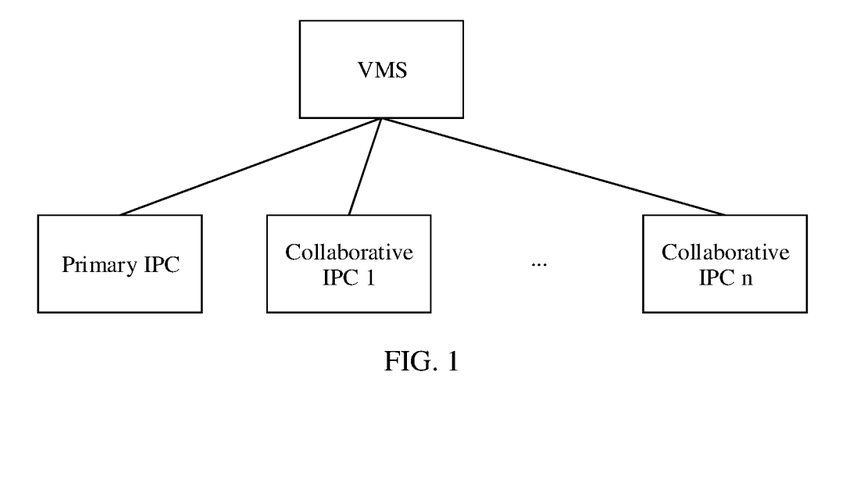
FIG. 1 is a schematic diagram of collaborative work of a plurality of IPCs in a video surveillance system.

In a security and protection system, security and protection subsystems such as a video surveillance system, an access control management system, and a firefighting system usually work independently. A plurality of IPCs in the video surveillance system may work in collaboration with each other. FIG. 1 is a schematic diagram of collaborative work of a plurality of IPCs in a video surveillance system.

The video surveillance system includes a plurality of IPCs, which includes a VMS, a primary IPC, and at least one collaborative IPC. Each IPC sends an obtained video stream to the VMS. After detecting an alarm event, one IPC may report the alarm event to the VMS. The VMS may send a control instruction to another IPC associated with the alarm event. In this way, the plurality of IPCs collaborate to continuously monitor a target. Herein, the alarm event detected by the IPC may be that a face in a database is detected through facial recognition, a photographing area is blocked, a target that intrudes into a specified area, or the like.

When the plurality of IPCs in the video surveillance system can work in collaboration with each other, the VMS needs to send a control instruction to the IPC. As a result, in a scenario with a relatively high requirement on real-time performance, for example, in an airport aircraft takeoff surveillance process requiring surveillance collaboration between a plurality of IPCs, reporting to the VMS by one IPC and then sending a control instruction by the VMS to invoke another IPC to perform a corresponding operation may cause a relatively long delay.

The embodiments provide a front-end device collaboration method, applied to a security and protection system to reduce a delay of a collaborative operation. The following describes related terms in the embodiments.

A security and protection system is a system including an intruder alarm system, a video surveillance and control system, an access control system, an explosion-proof security system, or is an electronic system or network combining or integrating the foregoing systems as subsystems. The security and protection system provided in the embodiments includes a security protection platform and a plurality of front-end devices.

A collaboration trigger event is an event that is preset in a front-end device and that may be detected or sensed by the front-end device. When detecting or sensing a collaboration trigger event, a first front-end device is triggered to request at least one second front-end device to perform a collaborative operation. For example, the collaboration trigger event may be an alarm event related to device performance of the first front-end device. For example, for an intelligent IPC, a preset collaboration trigger event may be a face in a database detected through a facial recognition technology. Alternatively, the collaboration trigger event may be an operation instruction that is input by a user and that is obtained by the first front-end device, for example, a tap on an area of a display screen of the IPC by the user.

Configuration information is a configuration parameter of a front-end device. The configuration information includes an internet protocol (IP) address, a port number, a protocol, a user name and a password, a collaboration capability set of the front-end device, and may further include location information and remark information. The IP address and the port number are used to determine a location of the front-end device in a network. The user name and the password are used for authentication. The protocol is a protocol including an open interface standard (open network video interface forum, ONVIF), a TC100 standard proposed by Security & Protection System of Standardization Administration of China, or the like. The collaboration capability set is a set of operations, for example, video recording, snapshot, zoom for high definition, or alarm bell ringing that can be performed by the front-end device based on a collaboration instruction.

A collaboration policy is a rule that corresponds a collaboration trigger event to an operation of a front-end device. When detecting a first collaboration trigger event, the first front-end device may determine, based on the collaboration policy, the second front-end device corresponding to the first collaboration trigger event, and may further determine, based on the collaboration policy, an operation that the second front-end device is triggered to perform.

A collaboration instruction is an instruction used to instruct a front-end device to perform a collaborative operation, and the collaboration instruction may carry operation information. For example, the first front-end device detects a face in a database through facial recognition, and based on the collaboration policy, a front-end device corresponding to this collaboration trigger event is the second front-end device. Further, an operation of the second front-end device is tracking shooting. In this case, the first front-end device sends a collaboration instruction to the second front-end device, where the collaboration instruction carries tracking shooting operation information and is used to instruct the second front-end device to perform the tracking shooting.

Figure 2:
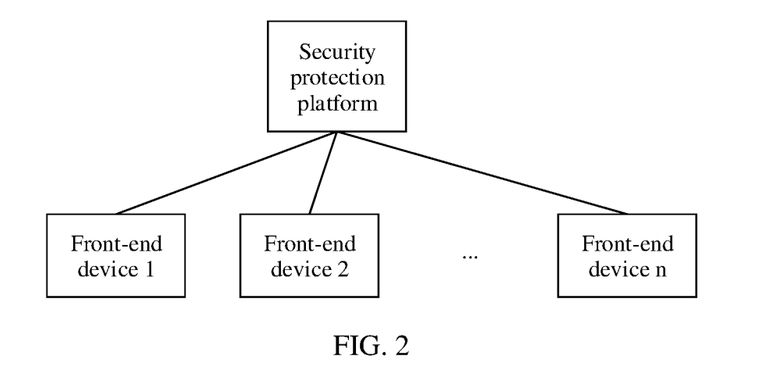
FIG. 2 is an architectural diagram of a security and protection system according to an embodiment.

FIG. 2 is an architectural diagram of a security and protection system according to an embodiment.

The security and protection system provided in this embodiment includes a security protection platform and a plurality of front-end devices, where the plurality of front-end devices are at least two front-end devices, and n in the figure is greater than or equal to 2.

The front-end device may be an IPC, a perimeter alarm, a smoke detector, an alarm bell, or other front-end sensor devices that are applied to the security and protection system. Types of the plurality of front-end devices in the security and protection system may be the same or different. A specific type of the front-end device is not limited herein.

The security protection platform is a back-end platform that manages a front-end device. If the front-end device is a sensor related to vehicle management or access control management, the security protection platform may be an IoT management platform. When the front-end devices are all IPCs, the security protection platform may alternatively be a VMS or an intelligent video surveillance (IVS).

Figure 3:
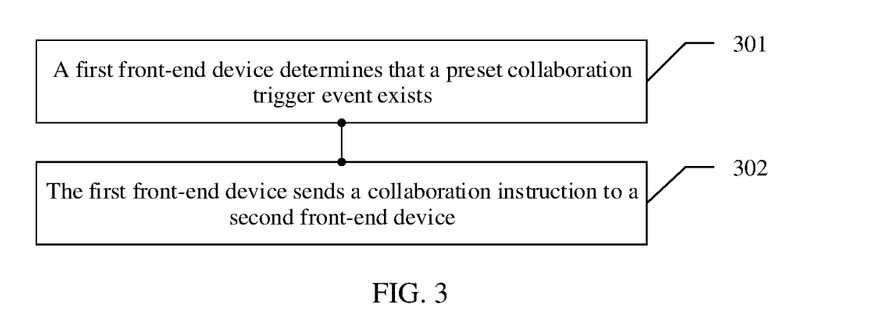
FIG. 3 is a schematic diagram of an embodiment of a front-end device collaboration method according to an embodiment.

Based on the architectural diagram of the security and protection system shown in FIG. 2, FIG. 3 is a schematic diagram of an embodiment of a front-end device collaboration method according to an embodiment.

301: A first front-end device determines that a preset collaboration trigger event exists.

The first front-end device in the security and protection system may determine whether the preset collaboration trigger event exists through detection. The first front-end device may be an IPC, a smoke detector, an alarm bell, or other front-end sensor devices that are applied to the security and protection system.

Optionally, the preset collaboration trigger event may be an alarm event related to device performance of the first front-end device. For example, for an intelligent IPC, the preset collaboration trigger event may be that a face in a database is detected through a facial recognition technology. For a common IPC, the preset collaboration trigger event may be that a photographing area is blocked, a target that intrudes into a specified area, or the like. For a smoke detector, the preset collaboration trigger event may be that a smoke concentration reaches a preset threshold.

Optionally, the preset collaboration trigger event may be an operation instruction that is input by a user and that is obtained by the first front-end device, for example, a tap on an area of a display screen of an IPC by the user, or a pressing operation that is performed by the user on an alarm key and that is obtained by an alarm bell.

302. If the preset collaboration trigger event exists, a first front-end device sends a collaboration instruction to a second front-end device.

If the preset collaboration trigger event exists, the first front-end device sends the collaboration instruction to the second front-end device, where the collaboration instruction is used to instruct the second front-end device to perform an operation corresponding to the collaboration instruction. Herein, the collaboration instruction does not need to be forwarded by a security protection platform, but is directly sent by the first front-end device to the second front-end device. The second front-end device performs the operation corresponding to the collaboration instruction based on an instruction of the collaboration instruction, where the operation corresponding to the collaboration instruction is related to a capability of the second front-end device. For example, if the second front-end device is an IPC, the operation corresponding to the collaboration instruction may be rotating a camera direction or photographing. If the second front-end device is an alarm bell, the operation corresponding to the collaboration instruction may be bell ringing. Herein, the operation corresponding to the collaboration instruction is not limited.

According to the front-end device collaboration method provided in this embodiment, if the first front-end device detects the collaboration trigger event, the first front-end device may send the collaboration instruction to the second front-end device, to instruct the second front-end device to perform the operation corresponding to the collaboration instruction. Because the first front-end device may directly send the collaboration instruction to the second front-end device, and the collaboration instruction does not need to be forwarded by the security protection platform, a delay of a collaborative operation can be reduced.

Figure 4:
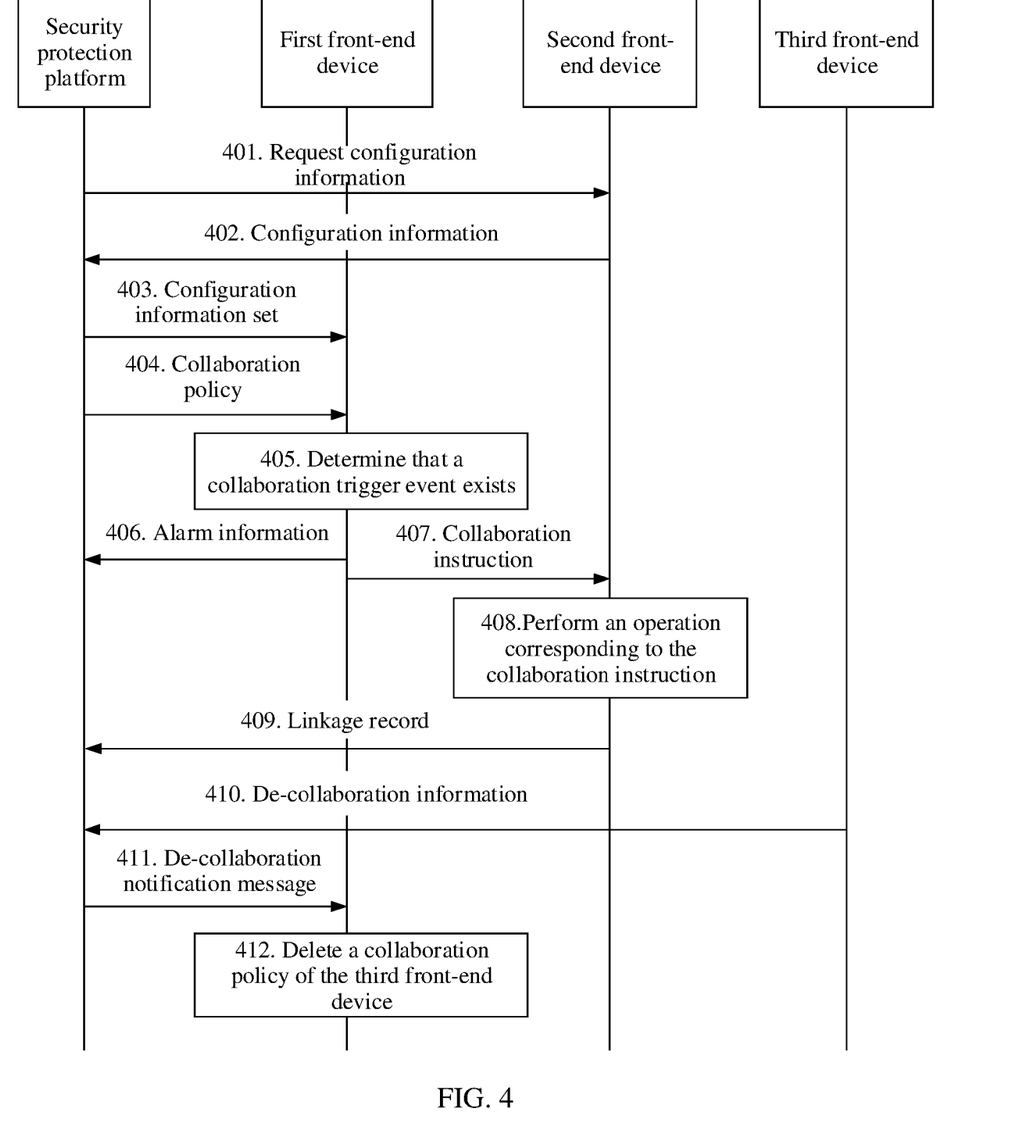
FIG. 4 is a schematic interaction diagram of an embodiment of a front-end device collaboration method according to an embodiment.

Based on the architectural diagram of the security and protection system shown in FIG. 2, FIG. 4 is a schematic interaction diagram of an embodiment of a front-end device collaboration method according to an embodiment.

It should be noted that the security and protection system includes a plurality of front-end devices. A user may choose to deploy all or some front-end devices based on an actual application requirement. For example, front-end devices on a particular floor of a building are deployed. A quantity of deployed front-end devices is not limited. In this embodiment, an example in which a first front-end device, a second front-end device, and a third front-end device are selected for deployment is used for description.

In this embodiment, the front-end devices are all devices having a network connection capability, and a wired or wireless communication connection may be established between the front-end devices.

401. A security protection platform requests configuration information from a front-end device.

The security protection platform first establishes a connection to the plurality of front-end devices in the security and protection system based on a protocol, and then obtains configuration information of each front-end device. It may be understood that the security protection platform may separately request configuration information from the first front-end device, the second front-end device, and the third front-end device. FIG. 4 shows only an example in which the security protection platform requests configuration information from the second front-end device.

402. The front-end device sends the configuration information to the security protection platform.

After receiving a request for the configuration information from the security protection platform, the front-end device may send the configuration information to the security protection platform. It may be understood that the first front-end device, the second front-end device, and the third front-end device may separately send their configuration information to the security protection platform. FIG. 4 shows only an example in which the second front-end device sends the configuration information to the security protection platform.

The configuration information includes an IP address, a port number, a protocol, a user name and a password, and a collaboration capability set, and may further include location information and remark information. The user name and the password may be used for authentication. The protocol may be an ONVIF or a TC100 protocol proposed by Security & Protection System of Standardization Administration of China. The collaboration capability set is a set of operations, for example, video recording, snapshot, zoom for high definition, or alarm bell ringing that can be performed by the front-end device based on a collaboration instruction.

After receiving the configuration information sent by the front-end device, the security protection platform locally stores an obtained configuration information set.

403. The security protection platform sends the configuration information set to a front-end device.

The security protection platform sends the configuration information set to the front-end device. It may be understood that the security protection platform may separately send the configuration information set to the first front-end device, the second front-end device, and the third front-end device. FIG. 4 shows only an example in which the security protection platform sends the configuration information set to the first front-end device.

The configuration information set sent by the security protection platform to the first front-end device includes the configuration information of the second front-end device and the configuration information of the third front-end device. After obtaining the configuration information set, the first front-end device locally stores the configuration information of the second front-end device and the configuration information of the third front-end device.

The first front-end device obtains the configuration information of the second front-end device from the configuration information set, where the configuration information of the second front-end device includes an IP address, a port number, a protocol, and a user name and a password of the second front-end device. The first front-end device may establish a communication connection to the second front-end device based on the foregoing information and complete authentication. In this way, the first front-end device may log in to and control the second front-end device. Optionally, the first front-end device may be bound to the second front-end device based on a user configuration. For example, the first front-end device logs in to the second front-end device based on the user name and the password in the configuration information of the second front-end device, and controls the second front-end device, until the second front-end device is unbound from the first front-end device. Optionally, when detecting the preset collaboration trigger event, the first front-end device logs in to the second front-end device based on the user name and the password in the configuration information of the second front-end device, and sends a collaboration instruction to the second front-end device, to instruct the second front-end device to perform an operation corresponding to the collaboration instruction. Optionally, the configuration information includes a collaboration capability set. The collaboration capability set carried in the configuration information of the second front-end device is a set of operations, for example, video recording, snapshot, or zoom for high definition that may be performed by the front-end device based on the collaboration instruction.

404. The security protection platform sends a collaboration policy to the front-end device.

The security protection platform may send the collaboration policy to the front-end device. It may be understood that the security protection platform may separately send the collaboration policy to the first front-end device, the second front-end device, and the third front-end device. FIG. 4 shows only an example in which the security protection platform sends the collaboration policy to the first front-end device.

The collaboration policy is a trigger rule of a collaborative operation performed by a plurality of front-end devices in real time after the front-end device detects the collaboration trigger event. For example, detecting a face in a database by the first front-end device through facial recognition is the collaboration trigger event. In this case, the second front-end device is triggered to track shooting. Alternatively, the first front-end device detects intrusion. In this case, the second front-end device is triggered to photograph for recording and the third front-end device is triggered to ring an alarm bell. Alternatively, the first front-end device receives a tap of a user on an image area. In this case, the second front-end device is triggered to rotate a camera to zoom in to photograph a selected area at high definition. Alternatively, the first front-end device detects an alarm event. In this case, the second front-end device is triggered to ring an alarm bell. A specific rule of the collaboration policy is not limited herein.

Optionally, the collaboration policy may be configured by the user on the security protection platform, and then the security protection platform delivers the collaboration policy to each front-end device. Alternatively, the collaboration policy may be directly configured by the user on a client of the front-end device. A configuration manner of the collaboration policy is not limited herein.

Optionally, the collaboration policy may carry a rule for binding front-end devices. For example, the second front-end device is bound to the first front-end device. For example, the first front-end device logs in to the second front-end device and maintains a persistent connection the first front-end device is unbound from the second front-end device. In a persistent connection state, the first front-end device may send the collaboration instruction to the second front-end device and does not need to log in to the second front-end device again.

After receiving the collaboration policy, the front-end device locally stores the collaboration policy.

405: The first front-end device determines that a collaboration trigger event exists.

The first front-end device may determine that the collaboration trigger event exists through detection. It may be understood that each front-end device in the security and protection system may determine that the collaboration trigger event exists. FIG. 4 shows only an example of the first front-end device.

Optionally, the preset collaboration trigger event may be an alarm event related to device performance of the first front-end device. For example, for an intelligent IPC, the preset collaboration trigger event may be that a face in a database is detected through a facial recognition technology. For a common IPC, the preset collaboration trigger event may be that a photographing area is blocked, a target that intrudes into a specified area, or the like. For a smoke detector, the preset collaboration trigger event may be that a smoke concentration reaches a preset threshold.

Optionally, the preset collaboration trigger event may be an operation instruction that is input by the user and that is obtained by the first front-end device, for example, a tap on an area of a display screen of an IPC by the user, or a pressing operation that is performed by the user on an alarm key and that is obtained by an alarm bell.

406: The first front-end device sends alarm information to the security protection platform.

If the first front-end device detects the collaboration trigger event in step 405, the first front-end device may send the alarm information to the security protection platform. Optionally, the first front-end device may further send the alarm information to a client of the first front-end device.

It should be noted that step 406 is an optional step, and may be performed or may not be performed. This is not limited herein.

407: The first front-end device sends a collaboration instruction to the second front-end device.

If the first front-end device detects the collaboration trigger event in step 405, the first front-end device sends the collaboration instruction to another front-end device in the security and protection system. The another front-end device may be at least one front-end device in the security and protection system. In this embodiment, the second front-end device is used as an example for description. The first front-end device sends the collaboration instruction to the second front-end device.

Optionally, because the collaboration policy specifies a rule that corresponds a collaboration trigger event to an operation of a front-end device, when detecting a first collaboration trigger event, the first front-end device may determine the second front-end device corresponding to the first collaboration trigger event based on the collaboration policy, and may further determine an operation that the second front-end device is triggered to perform based on the collaboration policy. The collaboration instruction may carry operation information corresponding to the second front-end device.

For example, the first front-end device detects a face in a database through facial recognition, and based on the collaboration policy, a front-end device corresponding to the collaboration trigger event is the second front-end device. Further, an operation of the second front-end device is tracking shooting. In this case, the first front-end device sends the collaboration instruction to the second front-end device, where the collaboration instruction carries tracking shooting operation information, and is used to instruct the second front-end device to perform tracking shooting.

It should be noted that there is no sequence for performing step 407 and step 406. Step 407 may be performed before step 406, or step 406 may be performed before step 407. This is not limited herein.

408: The second front-end device performs an operation corresponding to the collaboration instruction.

Because there is a communication connection between front-end devices, the second front-end device may directly receive the collaboration instruction sent by the first front-end device, and perform the corresponding operation according to the collaboration instruction. The collaboration instruction carries corresponding operation information. For example, the second front-end device performs tracking shooting according to an instruction of the collaboration instruction.

409: The second front-end device sends a linkage record to the security protection platform.

After performing the corresponding operation based on the collaboration instruction, the second front-end device sends the linkage record to the security protection platform, where the linkage record may include a collaborative operation event or a detection result.

It should be noted that step 409 is an optional step, and may be performed or may not be performed. This is not limited herein.

In an actual application, a case in which some front-end devices in the security and protection system need to cancel collaboration deployment may occur. In this embodiment, an example in which the third front-end device cancels collaboration deployment is used for description.

410: The third front-end device sends de-collaboration information to the security protection platform.

The third front-end device may send the de-collaboration information to the security protection platform based on an operation of the user, to instruct the security protection platform to cancel collaboration deployment of the third front-end device. The security protection platform may delete a collaboration policy of the third front-end device and update a local collaboration policy. In other words, the security protection platform may delete an operation that is related to triggering of the third front-end device from the collaboration policy. Optionally, the security protection platform may further delete configuration information of the third front-end device.

It should be noted that step 410 is an optional step, and may be performed or may not be performed. This is not limited herein.

411: The security protection platform sends a de-collaboration notification message to the front-end device.

After receiving the de-collaboration information sent by the third front-end device to the security protection platform, or when detecting that the third front-end device is offline for a period exceeding preset duration, or after obtaining an instruction for canceling collaboration deployment of the third front-end device from the user, the security protection platform may send the de-collaboration notification message to the front-end device.

It should be noted that the security protection platform may send the de-collaboration notification message to the first front-end device and the second front-end device. FIG. 4 shows only an example in which the security protection platform sends the de-collaboration notification message to the first front-end device.

412: The first front-end device deletes a collaboration policy of the third front-end device.

After receiving the de-collaboration notification message sent by the security protection platform for the third front-end device, or after detecting that the third front-end device is offline for a period exceeding preset duration, the first front-end device deletes the collaboration policy of the third front-end device and updates a local collaboration policy. For example, based on an original collaboration policy, when detecting an intrusion, the first front-end device triggers the second front-end device to photograph for recording and triggers the third front-end device to ring an alarm bell. Deleting the collaboration policy of the third front-end device is deleting an operation that triggers the third front-end device, and when detecting an intrusion, the first front-end device triggers only the second front-end device to photograph for recording.

Optionally, the first front-end device may further delete the configuration information of the third front-end device.

It should be noted that step 410 to step 412 are optional steps, and may be performed or may not be performed. This is not limited herein.

Figure 5:
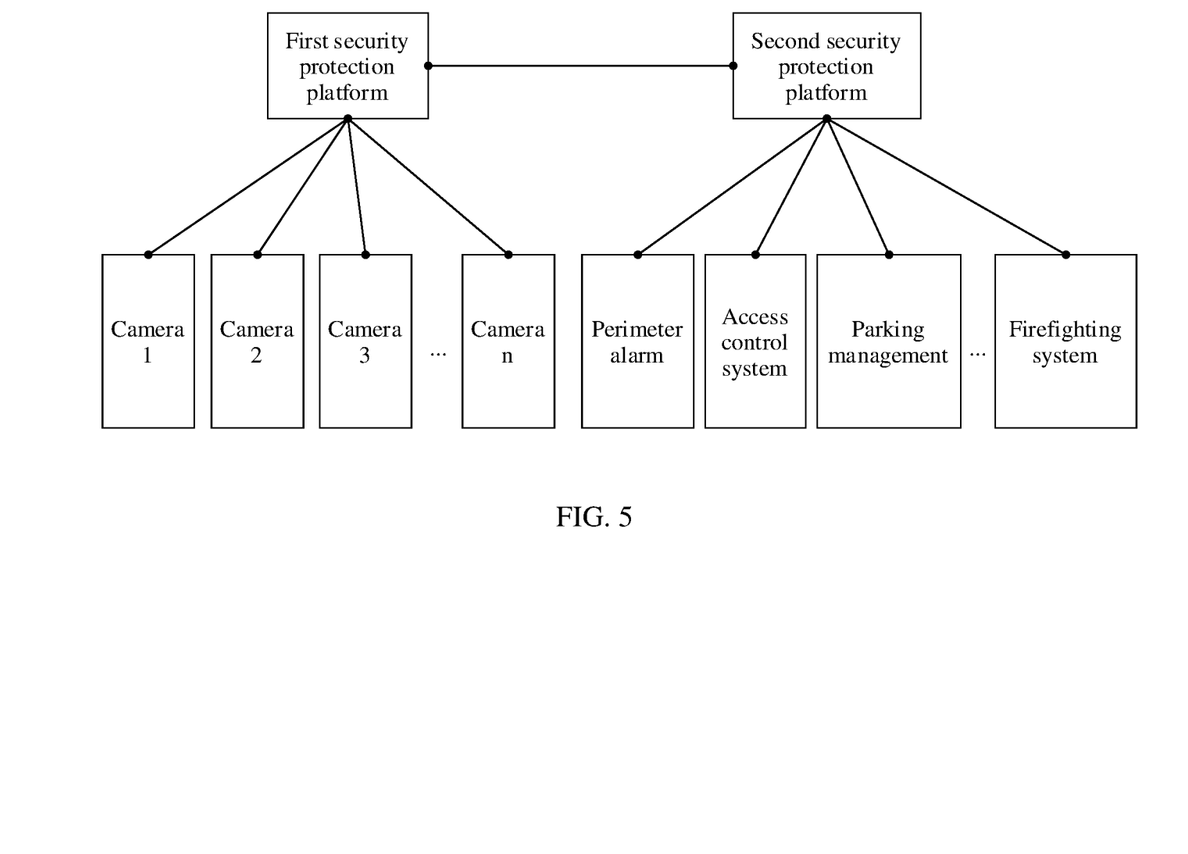
FIG. 5 is an architectural diagram of another security and protection system according to an embodiment.

FIG. 5 is an architectural diagram of another security and protection system according to an embodiment.

The security and protection system may have a plurality of security management platforms. Each management platform is associated with a plurality of front-end devices. Different management platforms are located in different local area networks. In an actual application, collaboration between front-end devices on different management platforms may be required. For example, refer to the architectural diagram of the security and protection system provided in FIG. 5.

The security and protection system includes a first security protection platform and a second security protection platform. The first security protection platform is associated with a plurality of front-end devices, and the second security protection platform is also associated with a plurality of front-end devices. The first security protection platform and the second security protection platform are separately located in different local area networks. As shown in the figure, the first security protection platform is associated with a plurality of cameras, and the first security protection platform may be a VMS. The second security protection platform is associated with front-end devices in a perimeter alarm system, an access control system, a parking management system, and a firefighting system, and the second security protection platform may be an IoT platform.

When the first security protection platform receives an alarm of an associated first front-end device, the first security protection platform may send a collaboration task to the second security protection platform. After receiving the collaboration task, the second security protection platform may send a collaboration instruction to an associated second front-end device, to instruct the second front-end device to perform an operation corresponding to the collaboration instruction.

In a possible implementation, after receiving the alarm of the associated first front-end device, the first security protection platform determines the second front-end device corresponding to the alarm event based on a preset collaboration policy. If the second front-end device is a front-end device associated with the second security protection platform, the first security protection platform distributes a collaboration task to the second security protection platform. The collaboration task carries information about the second front-end device. For example, parameters carried in the collaboration task include a task identification (ID), an ID of a target front-end device, an operation command, and a service parameter. Detailed descriptions are shown in the following table:

| Parameter | Descriptions |
| --- | --- |
| Task ID | Collaboration task ID, where the ID is unique in the security and protection system. |
| ID of a target front-end device | If an ID of a target front-end device has been specified on a task distribution node, this parameter cannot be left empty; or if a status of the target front-end device has not been specified on the task distribution node, leave this parameter empty. |
| Operation command | This command is a command operation, for example, video recording, photographing, alarming, and camera pan-tilt-zoom rotation that can be recognized by the security protection platform. |
| Parameter | For example, position information, where the target front-end device rotates a pan-tilt-zoom to a specified position based on the position information. |

After receiving the collaboration task, the second security protection platform determines the second front-end device based on the ID of the target front-end device, and sends the collaboration instruction to the second front-end device. The second front-end device executes an operation command based on the collaboration instruction. Optionally, the second front-end device may refuse to perform an operation corresponding to the collaboration instruction, and return a rejection message to the second security protection platform.

In another possible implementation, a collaboration policy is preset in the first front-end device. After detecting a preset alarm event, the first front-end device determines the corresponding second front-end device based on the preset collaboration policy and the alarm event. Optionally, the first front-end device may further determine a collaborative operation of the second front-end device. The first front-end device sends an alarm and a collaboration request to the first security protection platform, where the collaboration request carries an ID of the second front-end device. After receiving the collaboration request, the first security protection platform determines that the second front-end device is a front-end device associated with the second security protection platform, and distributes a collaboration task to the second security protection platform, where the collaboration task carries information about the second front-end device. After receiving the collaboration task, the second security protection platform sends the collaboration instruction to the second front-end device, and the second front-end device performs the collaborative operation based on the collaboration instruction. Optionally, the second front-end device may refuse to perform an operation corresponding to the collaboration instruction, and return a rejection message to the second security protection platform.

For example, a camera 1 discovers a target person through facial recognition, and sends alarm information to an IVS. The IVS determines that an alarm in a perimeter alarm system rings an alarm bell based on a preset collaboration policy. The IVS determines that the alarm is a front-end device associated with an IoT platform. The IVS distributes a collaboration task to the IoT platform, where the collaboration task carries an ID of the alarm, and an operation command is ringing the alarm bell. After receiving the collaboration task, the IoT platform sends a collaboration instruction to the alarm bell, to instruct the alarm bell to ring.

For example, after detecting that a smoke concentration reaches a threshold, a smoke alarm in a firefighting system determines that collaborative devices are a camera 2 and a camera 3 based on a preset collaboration policy, and sends alarm information, an ID of the camera 2, and an ID of the camera 3 to an IoT platform. A collaborative operation corresponding to the camera 2 is high-definition photographing, and a collaborative operation corresponding to the camera 3 is video recording. After receiving the collaboration task sent by the smoke alarm, the IoT platform determines that a security protection platform associated with the camera 2 and the camera 3 is an IVS, and therefore forwards the collaboration task to the IVS. After receiving the collaboration task, the IVS sends a collaboration instruction to the camera 2 and the camera 3. Based on the collaboration instruction, the camera 2 performs high-definition photographing and the camera 3 records a video. If the camera 2 is currently performing a task with a higher priority, for example, facial recognition or tracking shooting, the camera 2 may reject an instruction of the collaboration instruction and return a rejection message to the IVS, and the IVS may forward the rejection message to the IoT platform.

According to the front-end device collaboration method provided in this embodiment, front-end devices associated with security protection platforms in different local area networks may perform a collaboration task.

The foregoing describes the front-end device collaboration methods in the embodiments, and the following describes devices that implement the front-end device collaboration methods.

Figure 6:
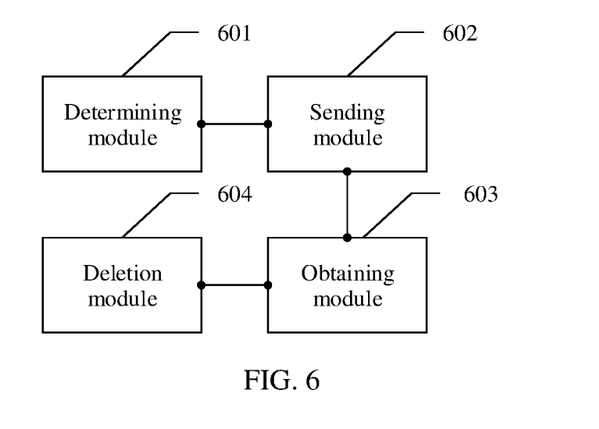
FIG. 6 is a schematic diagram of an embodiment of a front-end device according to an embodiment.

FIG. 6 is a schematic diagram of an embodiment of a front-end device according to an embodiment.

The front-end device provided in this embodiment includes:

a determining module 601, configured to determine that a preset collaboration trigger event exists; and a sending module 602, configured to send a collaboration instruction to a second front-end device, where the collaboration instruction is used to instruct the second front-end device to perform an operation corresponding to the collaboration instruction.

The front-end device further includes:

an obtaining module 603, configured to receive and store a configuration information set sent by a security protection platform, where the configuration information set includes configuration information of the second front-end device, and the configuration information of the second front-end device includes a capability of the second front-end device to perform the operation corresponding to the collaboration instruction.

The obtaining module 603 is further configured to:

before the sending module 602 sends the collaboration instruction to the second front-end device, obtain a collaboration policy.

The sending module 602 is configured to:

determine the second front-end device based on the collaboration policy; and send the collaboration instruction to the second front-end device.

The obtaining module 603 is configured to:

receive the collaboration policy sent by the security protection platform; or obtain the collaboration policy configured by a user on a client.

The front-end device further includes:

a deletion module 604, configured to delete a collaboration policy of the second front-end device from the collaboration policy when a communication connection between the second front-end device and the first front-end device is interrupted; or the obtaining module 603 is further configured to receive a de-collaboration notification message sent by the security protection platform; and the deletion module 604 is further configured to delete a collaboration policy of the second front-end device from the collaboration policy based on an instruction of the de-collaboration notification message.

Figure 7:
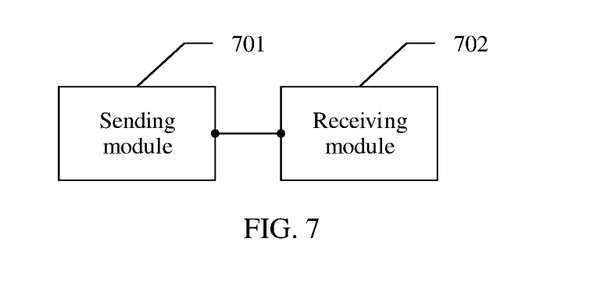
FIG. 7 is a schematic diagram of an embodiment of a security protection platform according to an embodiment.

FIG. 7 is a schematic diagram of an embodiment of a security protection platform according to an embodiment.

The security protection platform provided in this embodiment may be deployed on a dedicated hardware device, or integrated on a chip, or may be deployed on a cloud. This is not limited herein. The security protection platform includes:

a sending module 701, configured to send a collaboration policy to a first front-end device, where the collaboration policy is used by the first front-end device to determine a second front-end device from a plurality of front-end devices when the first front-end device detects a preset collaboration trigger event, and to instruct the second front-end device to perform an operation corresponding to a collaboration instruction; and a receiving module 702, configured to receive an alarm of the collaboration trigger event that is sent by the first front-end device.

The receiving module 702 is further configured to receive configuration information sent by the second front-end device, where the configuration information includes a capability of the second front-end device to perform the operation corresponding to the collaboration instruction; and the sending module 701 is further configured to send a configuration information set to the first front-end device, where the configuration information set includes the configuration information of the second front-end device.

The sending module 701 is further configured to: when the security protection platform detects that the second front-end device is offline, or when the security protection platform receives de-collaboration information sent by the second front-end device, send a de-collaboration notification message to the first front-end device, where the de-collaboration notification message is used to instruct the first front-end device to delete a collaboration policy of the second front-end device from the collaboration policy.

Figure 8:
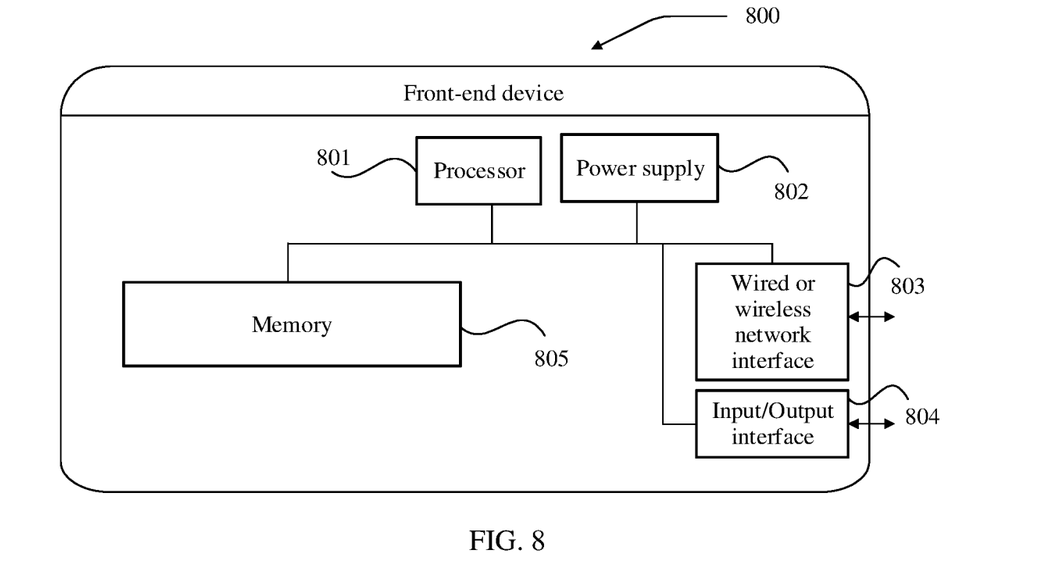
FIG. 8 is a schematic diagram of another embodiment of a front-end device according to an embodiment.

FIG. 8 is a schematic diagram of another embodiment of a front-end device according to an embodiment.

The front-end device 800 may perform relatively greatly because of different configurations or performance, and may include one or more processors 801 and memories 805. The memory 805 stores a program or data.

The memory 805 may be a volatile storage or a nonvolatile storage. The processor 801 may communicate with the memory 805 and execute a set of instructions in the memory 805 on the front-end device 800.

The front-end device 800 may further include one or more power supplies 802, one or more wired or wireless network interfaces 803, and one or more input/output interfaces 804.

For a procedure performed by the processor 801 of the front-end device 800 in this embodiment, refer to the method procedure described in the foregoing method embodiments. Details are not described herein.

Figure 9:
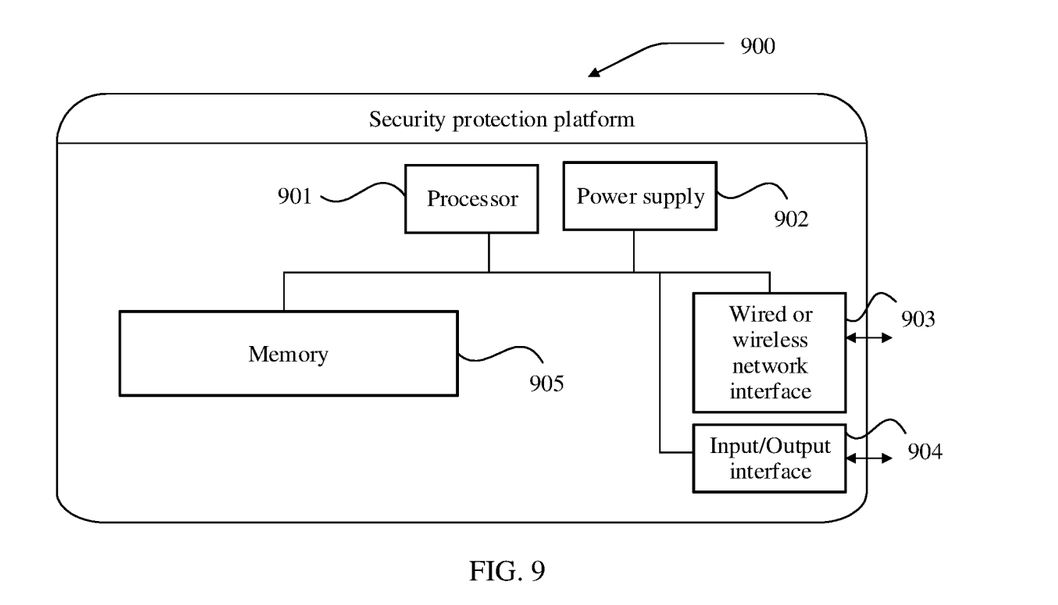
FIG. 9 is a schematic diagram of another embodiment of a security protection platform according to an embodiment.

FIG. 9 is a schematic diagram of another embodiment of a security protection platform according to an embodiment.

The security protection platform 900 may perform relatively greatly because of different configurations or performance, and may include one or more processors 901 and memories 905. The memory 905 stores a program or data.

The memory 905 may be a volatile storage or a nonvolatile storage. The processor 901 may communicate with the memory 905 and execute a set of instructions in the memory 905 on the security protection platform 900.

The security protection platform 900 may further include one or more power supplies 902, one or more wired or wireless network interfaces 903, and one or more input/output interfaces 904.

For a procedure performed by the processor 901 of the security protection platform 900 in this embodiment, refer to the method procedure described in the foregoing method embodiments. Details are not described herein.

It may be understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the solutions essentially, or the part contributing to the prior art, or all or some of the solutions may be implemented in the form of a software product. The software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the solutions, but are not limiting. Although the embodiments are described in detail, persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A front-end device collaboration method, comprising:
   determining, by a first front-end device of a security and protection system, that a preset collaboration trigger event exists;
   receiving and storing, by the first front-end device, a configuration information set sent by a security protection platform, wherein the configuration information set comprises configuration information of a second front-end device, and the configuration information of the second front-end device comprises a collaboration capability set of the second front-end device to perform an operation corresponding to a collaboration instruction, wherein the collaboration capability set comprises at least one operation of video recording, snapshot, and zoom for high definition; and
   sending, by the first front-end device, the collaboration instruction to the second front-end device of the security and protection system, wherein the collaboration instruction is used to instruct the second front-end device to perform the operation corresponding to the collaboration instruction.

2. The method according to claim 1, wherein before the sending, by the first front-end device, of the collaboration instruction to the second front-end device, the method further comprises:
   obtaining, by the first front-end device, a collaboration policy; and
   the sending, by the first front-end device, of the collaboration instruction to the second front-end device comprises:
   determining, by the first front-end device, the second front-end device based on the collaboration policy; and
   sending, by the first front-end device, the collaboration instruction to the second front-end device.

3. The method according to claim 2, wherein the obtaining, by the first front-end device, of the collaboration policy comprises:
   receiving, by the first front-end device, the collaboration policy sent by the security protection platform; or
   obtaining, by the first front-end device, the collaboration policy configured by a user on a client.

4. The method according to claim 2, further comprising:
   when a communication connection between the first front-end device and the second front-end device is interrupted, deleting, by the first front-end device, a collaboration policy of the second front-end device from the collaboration policy; or
   receiving, by the first front-end device, a de-coordination notification message sent by the security protection platform, and deleting, by the first front-end device, a collaboration policy of the second front-end device from the collaboration policy based on an instruction of the de-coordination notification message.

5. A front-end device collaboration method, comprising:
   sending, by a security protection platform, a collaboration policy to a first front-end device of a security and protection system, wherein the collaboration policy is used by the first front-end device to determine the second front-end device of the security and protection system from a plurality of front-end devices when the first front-end device detects a preset collaboration trigger event, and to instruct the second front-end device to perform an operation corresponding to a collaboration instruction;
   receiving, by the security protection platform, an alarm of the collaboration trigger event that is sent by the first front-end device;
   receiving, by the security protection platform, configuration information sent by the second front-end device, wherein the configuration information comprises a collaboration capability set of the second front-end device to perform the operation corresponding to the collaboration instruction, wherein the collaboration capability set comprises at least one operation of video recording, snapshot, and zoom for high definition; and
   sending, by the security protection platform, a configuration information set to the first front-end device, wherein the configuration information set comprises the configuration information of the second front-end device.

6. The method according to claim 5, further comprising:
   when the security protection platform detects that the second front-end device is offline, or when the security protection platform receives de-collaboration information sent by the second front-end device, sending, by the security protection platform, a de-collaboration notification message to the first front-end device, wherein the de-collaboration notification message is used to instruct the first front-end device to delete a collaboration policy of the second front-end device from the collaboration policy.

7. A front-end device acted as a first front-end device of a security and protection system, the first front-end device comprising at least one processor and a memory, the memory stores a computer program, that when executed by the at least one processor, causes the server to perform operations comprising:

determining a preset collaboration trigger event exists;

receiving and storing a configuration information set sent by a security protection platform, wherein the configuration information set comprises configuration information of a second front-end device, and the configuration information of the second front-end device comprises a collaboration capability set of the second front-end device to perform an operation corresponding to a collaboration instruction, wherein the collaboration capability set comprises at least one operation of video recording, snapshot, and zoom for high definition; and sending the collaboration instruction to the second front-end device of the security and protection system, wherein the collaboration instruction is used to instruct the second front-end device to perform the operation corresponding to the collaboration instruction.

8. The front-end device according to claim 7, wherein before the sending operation, the operations further comprise:

obtaining a collaboration policy; and the sending step comprises:

determining the second front-end device based on the collaboration policy; and sending the collaboration instruction to the second front-end device.

9. The front-end device according to claim 8, wherein the obtaining operation comprises:

receiving the collaboration policy sent by the security protection platform; or obtaining the collaboration policy configured by a user on a client.

10. The front-end device according to claim 8, wherein the operations further comprise:

deleting a collaboration policy of the second front-end device from the collaboration policy, when a communication connection between the first front-end device and the second front-end device is interrupted; or receiving a de-coordination notification message sent by the security protection platform, and, deleting a collaboration policy of the second front-end device from the collaboration policy based on an instruction of the de-coordination notification message.

11. The front-end device according to claim 8, wherein the first front-end device and the second front-end device are cameras.

12. A security protection platform comprising at least one processor and a memory, the memory stores a computer program, that when executed by the at least one processor, causes the security protection platform to perform operations of the method of claim 5.

13. The security protection platform according to claim 12, wherein the operations further comprise:

receiving configuration information sent by the second front-end device, wherein the configuration information comprises a collaboration capability set of the second front-end device, to perform the operation corresponding to the collaboration instruction, wherein the collaboration capability set comprises at least one operation of video recording, snapshot, and zoom for high definition; and sending a configuration information set to the first front-end device, wherein the configuration information set comprises the configuration information of the second front-end device.

14. The security protection platform according to claim 12, wherein the operations further comprise:

sending a de-collaboration notification message to the first front-end device when the second front-end device is offline, or when the at least one processor receives de-collaboration information sent by the second front-end device, wherein the de-collaboration notification message is used to instruct the first front-end device to delete a collaboration policy of the second front-end device from the collaboration policy.

15. The security protection platform according to claim 12, wherein the first front-end device and the second front-end device are cameras.

* * * * *